UNITED STATES PATENT OFFICE.

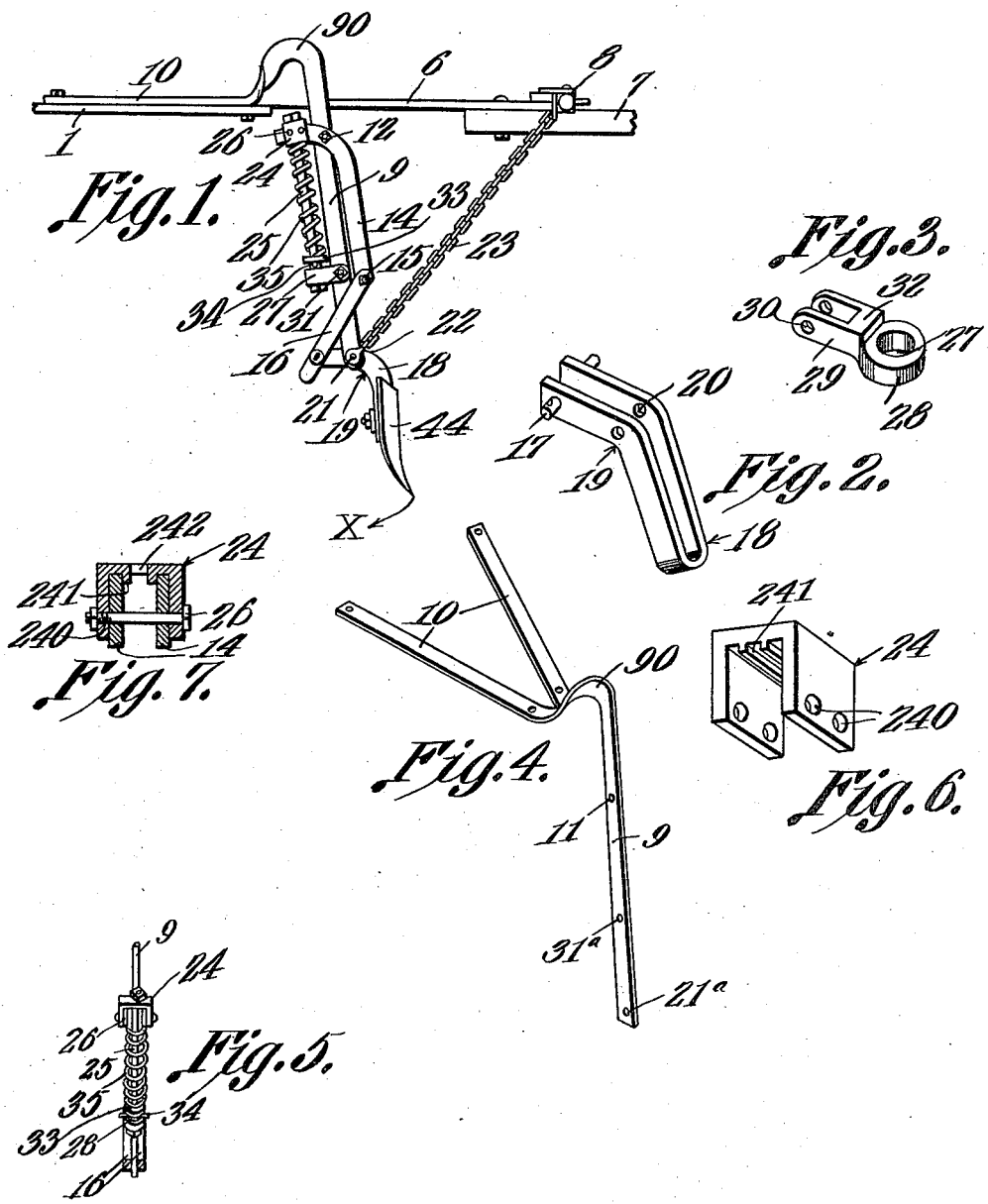

DAVID W. MARTIN, OF MOUNT AIRY, MARYLAND.

CULTIVATOR-TOOTH AND CONNECTION.

1,034,474.

Specification of Letters Patent. Patented Aug. 6, 1912.

Application filed July 7, 1911. Serial No. 637,279.

*To all whom it may concern:*

Be it known that I, DAVID W. MARTIN, a citizen of the United States, residing at Mount Airy, in the county of Carroll and State of Maryland, have invented a new and useful Cultivator-Tooth and Connection, of which the following is a specification.

One object of the present invention is, to provide an attachment for a corn planter, which attachment comprises a furrow opener, yieldingly supported in a novel manner, thereby to receive the thrust of an obstruction of any sort, encountered by the furrow opener.

A further object of the invention is to improve generally, and to increase the efficiency of, devices of the type to which the present invention appertains.
With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.
In the accompanying drawings, forming a part of this application,—Figure 1 shows the invention in side elevation; Fig. 2 is a perspective of the share lever; Fig. 3 is a detail perspective of an element whereby the lower end of the spring which receives a thrust of the share, is supported; Fig. 4 is a detail perspective of the hanger which supports the share; Fig. 5 is a fragmental rear elevation of the spring controlled lever, shown in Fig. 1, together with attendant parts; Fig. 6 is a perspective of the cap which rests upon the upper end of the share lever; and Fig. 7 is a transverse section of the cap shown in Fig. 6, and of the share lever with which the cap is assembled.

In carrying out the invention there is provided as a primary and fundamental element, a supporting frame 1, which may be of any desired form. Projecting forwardly from the frame 1, and attached thereto in any desired manner, is a supporting bar 6, carrying the tongue 7, upon which is pivoted, as usual, the doubletree 8.

A hanger, denoted generally by the numeral 9 is provided, the upper end of the hanger 9 being arched, to form a goose neck 90, extended above the frame 1, for a purpose to be described hereinafter, the goose neck 90 branching at its rear end, to form arms 10, whereby the hanger 9 is connected directly to the frame 1. Intermediate the ends of the hanger 9, there is an opening 11, seen in Fig. 4, and adapted to receive a pivot member 12, shown in Fig. 1, upon which pivot member is fulcrumed a lever 14, intermediate its ends, the lever 14 being a two-part structure, as shown in Fig. 7, the constituent elements of the lever lying upon opposite sides of the hanger 9. The lever 14 is curved, and comprises, as seen most clearly in Fig. 1, a relatively long segment, disposed substantially vertically, and in front of the hanger 9, and a relatively short segment, extended to the rear of the hanger 9 in a substantially horizontal position.

Through the lower end of the lever 14 is extended a pivot element 15, carrying the upper ends of links 16, the lower ends of which are provided with openings, adapted to receive, pivotally, lugs 17, outstanding laterally from the arms of a U-shaped standard 18, the outline of which is shown most clearly in Fig. 2. Cotter pins or the like, inserted through the lugs 17, serve to maintain the links 16 upon the lugs 17. Intermediate its ends, as shown at 19, the share lever 18 is bent downwardly, so that its forward end will be positioned properly to receive the share 44. The share lever 18 is equipped, adjacent its angle, with openings 20, adapted to receive a pin 21 which pin, entering an opening 21$^a$ in the lower end of the hanger 9, constitutes a means whereby the share lever 18 is pivotally assembled with the lower end of the hanger. This pin carries, likewise, a clevis 22, to which is connected one end of a flexible element, preferably a chain 23, the upper end of which is secured to the doubletree 8.

The constituent portions of the lever 14 are connected, to the rear of the hanger 9, by means of a cap 24, shown most clearly in Fig. 6, and of U-shape. The arms of the cap 24 embrace the sides of the lever 14, and in the arms of the cap, there are spaced openings 240, through which, and through the rear end of the lever 14, extend securing elements 26. The upper portion of the cap 24 is equipped with a pair of depending ribs 241, adapted to register between the constituent portions of the lever 14, as clearly shown in Fig. 7. There is an opening 242 in the top of the cap 24, which opening receives, slidably, a rod 25, extended downwardly between the securing members 26. The rod 25 is carried downwardly, through an opening 27, formed in the end of an arm 28, having ears 29, in which there are openings 30, adapted to receive a connecting element 31, extended through an opening 31ª in the hanger 9. In order to prevent the arm 28 from having downward movement upon the arm 9, the ears 29 are connected by a shoulder 32 which is adapted to engage the rear edge of the hanger 9. The lower end of the rod 25 is surrounded by a washer 33 and a pin 34 is inserted transversely through the rod 25, below the washer 33, the pin 34 resting upon the upper edge of the arm 28, to prevent a downward movement of the rod 25 therein. A compression spring 35 surrounds the rod 25, the spring abutting at its lower end against the washer 33, the upper end of the spring abutting against the lower edge of the rear end of the lever 14.

Noting particularly Fig. 1 of the drawings, it will be understood that as the machine is drawn forwardly over the ground, the furrow opener or share 44 will exercise its obvious function, it is to be observed that the thrust against the share 44 will serve to tilt the share, and the share lever 18 in the direction of the arrow X in Fig. 1, the share lever exerting an upward thrust, through the medium of the links 16, against the lower end of the lever 14, the upper end of which will be depressed, putting the spring 35 under tension, the spring thus serving to support the share 44 yieldingly.

It frequently happens that a heavier share 44 is required, the spring 35, and its accessory parts, being increased in size accordingly. Owing to the fact that the hanger 9 is equipped with the goose neck 90, the parts which the hanger 9 carries, may be increased in size accordingly.

Having thus described the invention, what is claimed is:—

1. In a device of the class described, a frame; a hanger fixed to and depending from the frame; a lever fulcrumed intermediate its ends upon the hanger and extended across the hanger, the lever consisting of spaced parts; an arched cap inclosing said parts, to the rear of the hanger, and having depending ribs adapted to engage between the constituent parts of the lever; a rod mounted to slide in the cap; an arm connected with the hanger and rearwardly extended therefrom, the arm having an opening adapted to receive the rod; means engaging the rod and the arm to prevent a downward movement of the rod therein; a compression spring surrounding the rod and bearing at its lower end against the arm, the upper end of the spring bearing against the rear end of the lever; a link extended across the hanger and pivotally connected at its upper end to the lower end of the lever; a share holder fulcrumed intermedate its ends upon the lower end of the hanger and pivotally connected at its rear end with the rear, lower end of the link; and a share carried by the share holder.

2. In a device of the class described, a frame; a hanger depending therefrom; a share-holder fulcrumed intermediate its ends upon the hanger; a share carried by one end of the share-holder; and resilient means for connecting the other end of the share-holder with the hanger.

3. In a device of the class described, a share-holder fashioned from a bar of equal width throughout, the bar being bent into U-form to fashion arms, the arms being bent to define an angle in the share-holder, there being lugs outstanding from the arms; a hanger across which the arms extend, and to which the angle of the share-holder is pivoted; plates connected with the lugs and extended across the hanger; a two-part lever extended across the hanger and pivoted in its intermediate portion to the hanger, one end of the lever being connected with the links; an arched cap connecting the parts of the lever, adjacent the other end of the lever; an arm secured to the hanger, below the pivotal mounting of the lever; and a spring operatively connected with the last mentioned arm and with the arched cap.

4. In a device of the class described, a frame; a hanger including a straight portion depending from the frame; a lever pivoted to the straight portion of the hanger and including an approximately vertical segment located in front of, and approximately parallel to, the straight portion of the hanger, and an approximately horizontal segment extended across the hanger, to the rear of the hanger; an arm secured to the hanger, below the pivotal mounting of the lever, the arm projecting rearwardly from the hanger; a compression spring located to the rear of the hanger and interposed between the rear end of the lever and said arms; a share-holder pivotally connected with the lower end of the hanger; and a link extended across the hanger and united pivotally at its ends with the lower end of the lever and with the rear end of the share-holder.

In testimony that I claim the foregoing as my own, I have hereto affixed my signature in the presence of two witnesses.

DAVID W. MARTIN.

Witnesses:
J. A. NICE,
B. S. DORSEY, Jr.

Copies of this patent may be obtained for five cents each, by addressing the "Commissioner of Patents, Washington, D. C."